C. B. THOMAS.
PLANTER.
APPLICATION FILED MAR. 11, 1912.

1,031,299.

Patented July 2, 1912.
4 SHEETS—SHEET 3.

Witnesses
J. P. Britt
E. C. Duffy

Inventor
Charles B. Thomas
By
Attorneys

COLUMBIA PLANOGRAPH CO., WASHINGTON, D. C.

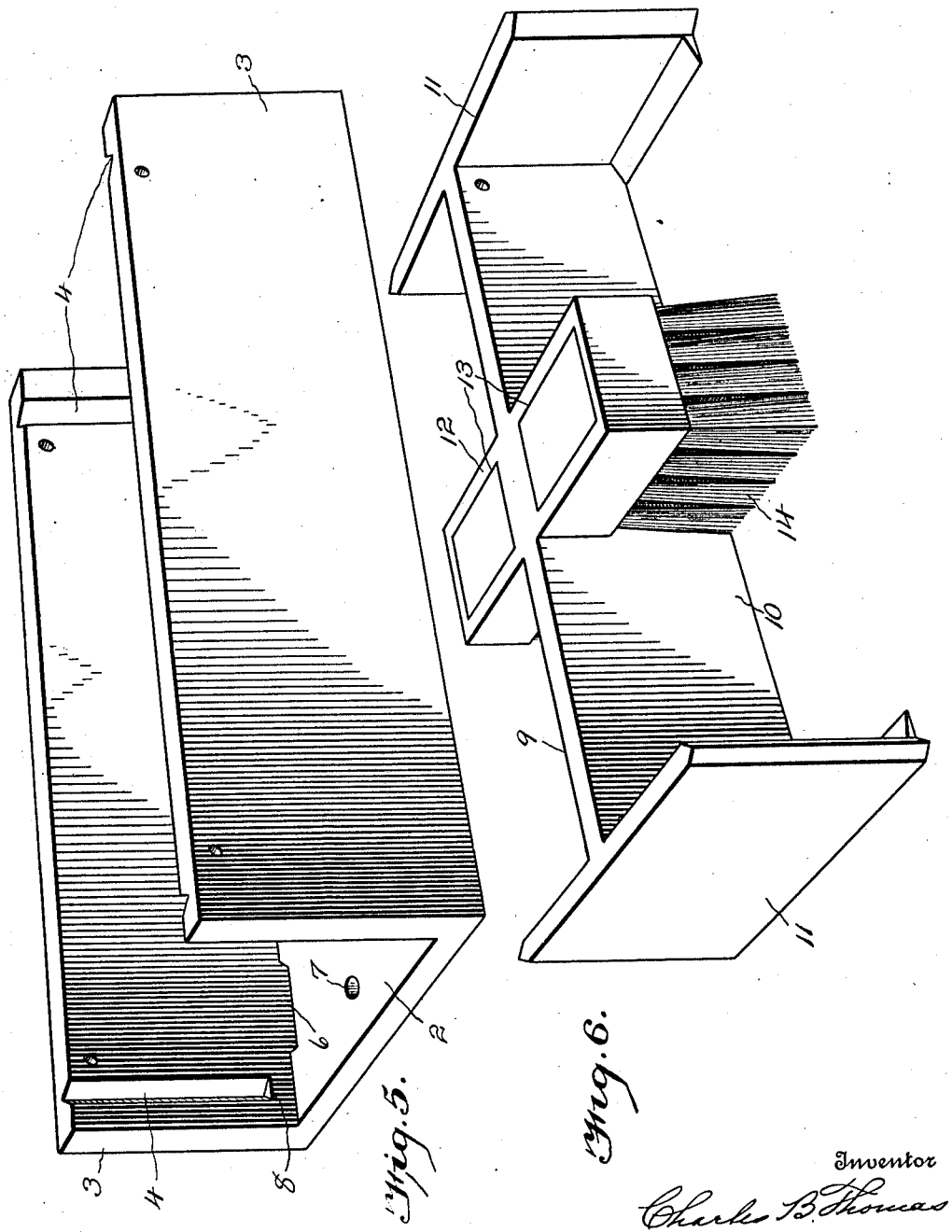

UNITED STATES PATENT OFFICE.

CHARLES B. THOMAS, OF WATTS, SOUTH CAROLINA.

PLANTER.

1,031,299. Specification of Letters Patent. Patented July 2, 1912.

Application filed March 11, 1912. Serial No. 683,007.

*To all whom it may concern:*

Be it known that I, CHARLES B. THOMAS, a citizen of the United States, residing at Watts, in the county of Abbeville and State of South Carolina, have invented certain new and useful Improvements in Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to planters and has for its object to provide a device for planting seeds such as corn or other grain in such manner that two different kinds of grain can be dropped from the planter simultaneously or alternately.

A further object of the invention is to provide a planter in which one kind of grain can be dropped from the planter either in single or in double quantities.

A further object of the invention is to provide a planter which is so constructed and arranged as to be manufactured at a minimum cost.

With these and other objects in view the invention consists in the novel construction of the planter and particularly in the novel construction of the body of the planter and the integral partitions and sides, the invention also consisting in the combination between the body of the planter and the auxiliary hoppers arranged and combined in such manner that the auxiliary hoppers fasten and maintain the body of the planter and the partitions in their proper relative positions.

The invention further consists in the novel construction for pivoting the hopper doors.

The invention further consists further in the novel details of construction and in combinations of parts, all of which will be first fully described and afterward specifically pointed out in the appended claims.

Figure 1:
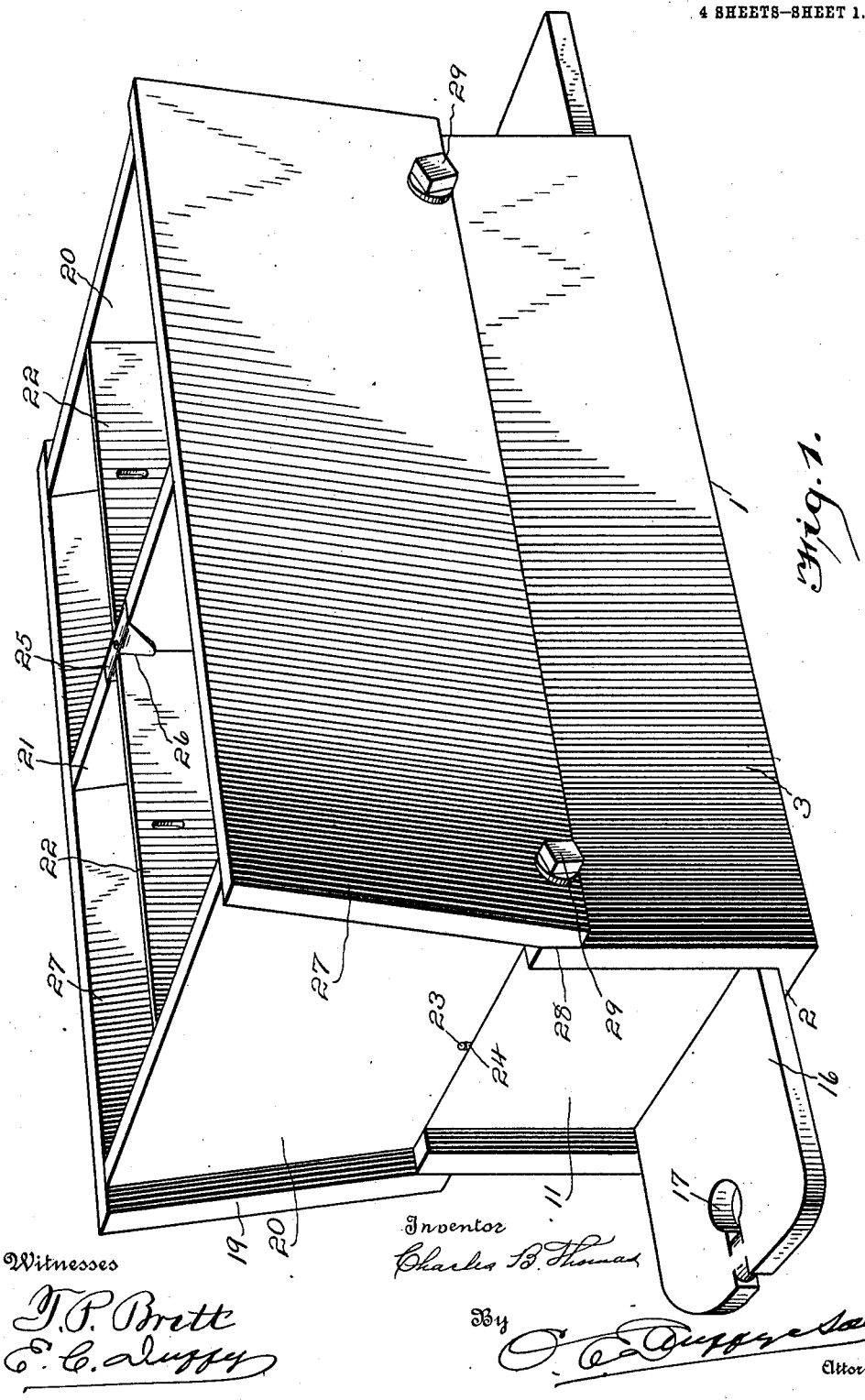
Figure 2:
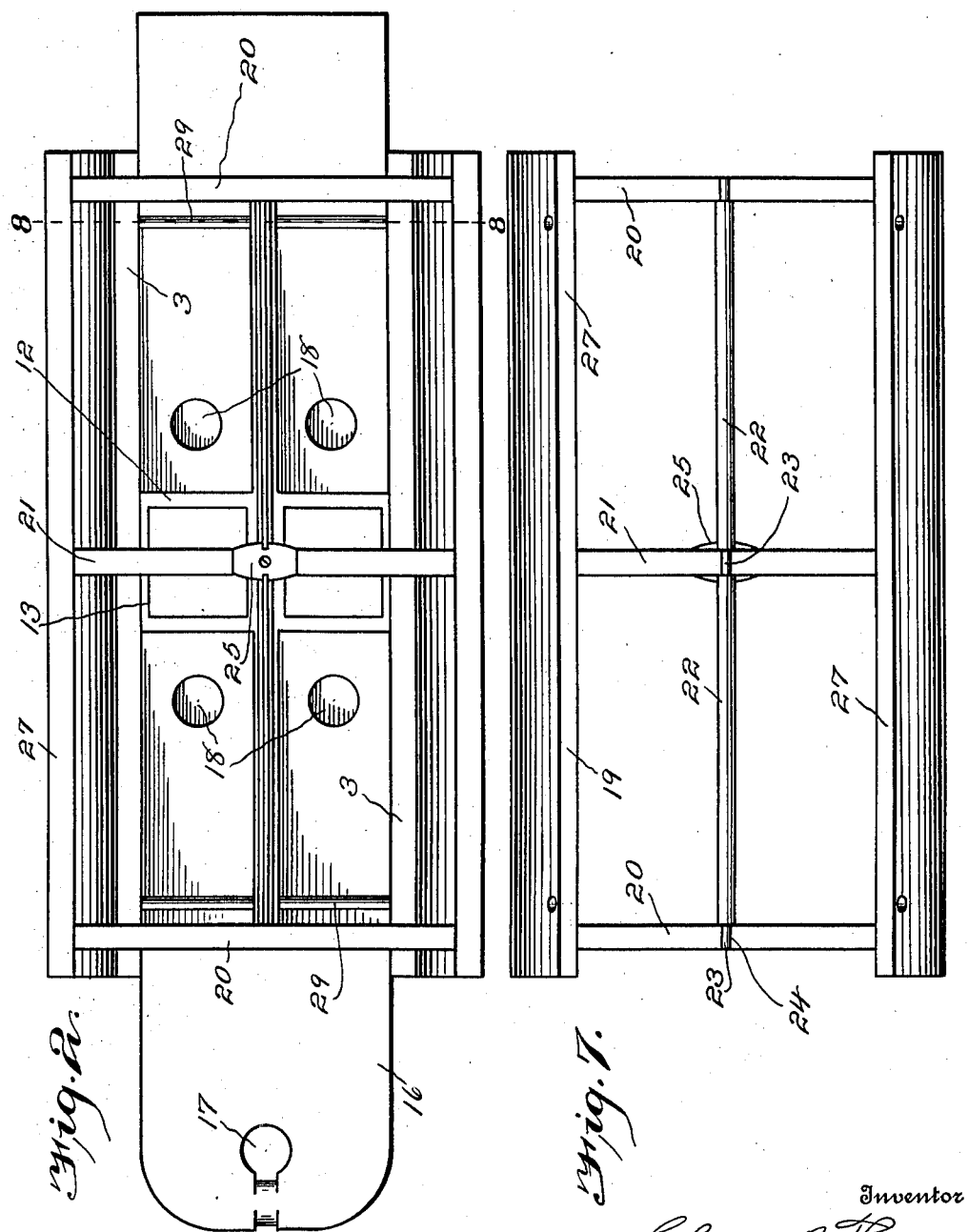
Figure 3:
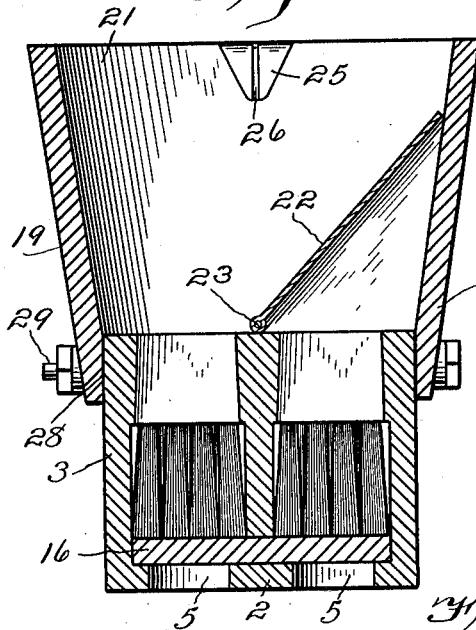
Figure 8:
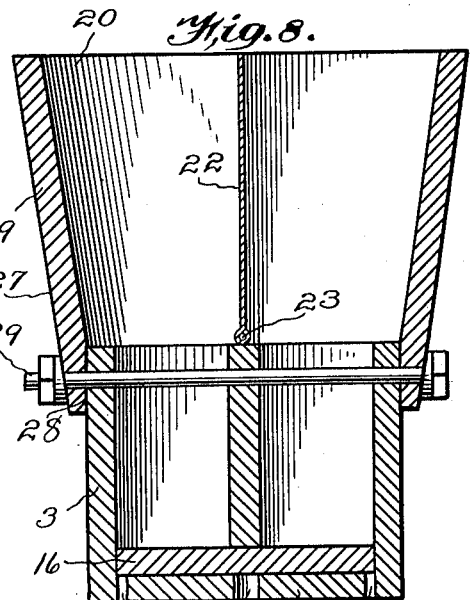
Figure 4:
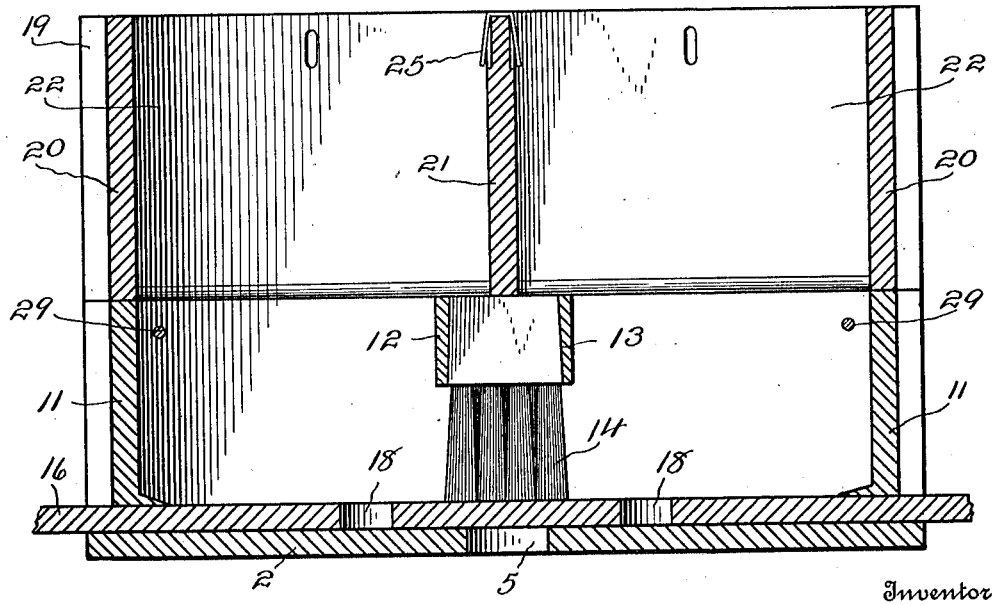

Referring to the accompanying drawings:
Figure 1 is a perspective view of the body of a planter constructed in accordance with this invention, the top of the auxiliary hoppers being removed in order to illustrate the construction. Fig. 2 is a top plan view. Fig. 3 is a transverse vertical sectional view. Fig. 4 is a longitudinal vertical sectional view. Fig. 5 is a perspective view of the bottom and sides section of the body. Fig. 6 is a perspective view of the partition and ends section. Fig. 7 is a bottom plan view of the auxiliary hoppers showing the construction for pivoting the hopper doors, and Fig. 8 is a transverse vertical sectional view taken on line 8—8 of Fig. 2.

Like numerals of reference indicate the same parts throughout the several figures in which;

1 indicates the planter body having its bottom 2 and sides 3 cast integral, the said sides 3 being provided near their ends with vertical V-shaped grooves 4, while two preferably annular openings 5 are located centrally of the bottom 2 as is shown in the drawings. Arranged in the bottom 2 are a plurality of slots 6 and centrally disposed perforations 7 for the purpose of allowing the escape of dust and the like which accumulates in the bottom 2. As will appear from the drawings the V-shaped grooves 4 terminate at the points 8 a short distance above the surface of the bottom 2.

9 indicates the partition and ends section of the planter body which comprises the central longitudinal partition 10, the ends 11 and the central transverse partition 12, said central transverse partition 12, longitudinal partition 10 and ends 11 being cast integral while the central transverse partition 12 is provided with two preferably rectangular openings 13 within which to introduce and maintain the brushes 14, said brushes extending to the bottom of the longitudinal partition 10 as will appear from the drawings.

The vertical side edges of the ends 11 are formed in V-shape to enter the V-shaped grooves 4 in the sides 3 of the bottom portion, while the said ends 11 bottom at the points 8 which are the termination of the V-shaped grooves 4 in the said sides 3, thus the said ends 11, central longitudinal partition 10 and brushes 14 are disposed and supported slightly above the surface of the bottom 2. The space thus provided between the said ends 11, central longitudinal partition 10 and brushes 14, is for the purpose of receiving the seed slide 16, said seed slide 16 being of a width to completely cover the bottom 2 of the body and being of a length sufficient to permit the said slide to project beyond the said ends 11 at both ends of the body, the said seed slide 16 being provided at one end thereof with a perforation 17 for connection with a moving or reciprocating element on the planter machine, it being of course understood that this planter body may be applied to any form or type of machine having a reciprocating part in order to reciprocate the said seed slide 16. Arranged in the said seed slide 16 are four preferably circular perforations 18 arranged in pairs as shown, each perforation 18 being arranged and spaced in the slide 16 so as to communicate with its hopper as will appear from Fig. 2.

19 indicates the auxiliary hopper which comprises the end pieces 20, the central transverse partition 21 and the longitudinal partitioning doors 22, said longitudinal partitioning doors 22 being pivoted on a rod 23 which rod 23 is carried in a groove 24 which groove 24, rod 23 and partitioning doors 22 are disposed directly above and on the central longitudinal partition 10 of the body portion in order to effectually maintain the said rod 23 and partitioning doors 22 in proper position when the structure is assembled. Arranged on the central transverse partition of the auxiliary hoppers is a spring catch 25 which is provided with a vertical slot 26 on each side of the transverse partition 21 arranged so that the longitudinal partitioning doors 22 will enter the said slots 26 in the manner as shown in the drawings in order to maintain the said partitioning doors in a vertical position. The side portions 27 of the auxiliary hopper are preferably flared as shown, the lower portions of the said sides being beveled or chamfered at 28 in order to snugly pass over the sides 3 of the bottom portion of the body, the said end pieces 20 of the auxiliary hopper bottoming on the ends 11 of the body portion as is shown in the drawings.

When the structure is assembled in the manner described a transverse fastening bolt 29 is passed over through the lower beveled or chamfered portions of the side members of the auxiliary hopper through the sides 3 of the body portion, through the central longitudinal partition 10 of the body portion in such manner as to tie and connect the entire structure together, a bolt 29 being provided at each end and comprising the only fastenings required for the entire device.

Having thus described the several parts of this invention its operation is as follows: When it is desired to plant two different kinds of seeds simultaneously the said seeds are placed in the two hoppers to one side of the central transverse partition 12 and as the seeds in the said hoppers enter the perforations 18 in the seed slide 16 and the said seed slide 16 is reciprocated the seeds in said perforations 18 are carried to the center of the body and directly over the perforations or openings 5 and in the bottom 2 of the body through which perforations 5 the seeds drop from the planter while the transverse brushes 14 prevent the excess accumulation of seeds in the perforations 18 in the slide and maintain an equal distribution of the seeds. It is of course apparent from an inspection of the accompanying drawings that seeds of different kinds can be planted with this construction either simultaneously or alternately according as the seeds are arranged in the said hoppers, while a double quantity of one kind of seeds can be planted by placing the same kind of seeds in all of the hoppers or a less amount of seed can be planted by placing the seed in only one of the hoppers. In other words the amount of seed planted can be varied at will by arranging the seed in one or more of the hoppers as is of course clearly evident. When, however, it is desired to plant from only two of the hoppers either one or two kinds of seed the longitudinal partitioning doors 22 can be swung down into position shown in the drawings which causes both of the auxiliary hoppers 19 to communicate with only two of the body hoppers, the said partitioning doors being maintained in their inclined position by reason of the weight of the seed in the auxiliary hoppers 19.

Having thus fully described the operation of the invention and the construction and means for assembling the parts particularly it is desired to lay particular stress and attention upon the extreme simplicity of the parts constituting this invention, as by reason of the construction of the body portion of the device and particularly the construction of the partition and ends section of the body the structure can be manufactured at a minimum cost while the same can be assembled and knocked down in a short period of time and without the use of tools or implements of any kind. Attention is also particularly directed to the arrangement of the auxiliary hopper in connection with the body portion and to the two fastening means by means of which the entire structure is tied and fastened together.

It is of course evident from an inspection of the accompanying drawings taken in connection with the foregoing specification that changes and alterations can be made in this construction, and I consider myself clearly entitled to all such changes and modifications as fall within the limit and scope of the appended claims.

What I claim as new and desire to secure by Letters Patent of the United States is:—

1. A planter of the character described comprising a bottom and sides portion, said bottom and sides portion being cast integrally, the sides being provided near their ends with vertical V-shaped grooves terminating near the upper surface of the bottom, a partition and ends portion cast integrally, the ends being formed V-shaped at their edges to enter the said V-shaped grooves in the said sides and to bottom in the said grooves in such manner as to maintain the said ends a short distance above the upper surface of the said bottom, the said partition and ends portion comprising also a central transverse partition cast integrally with the partition and ends section, said transverse partition being provided with two rectangular openings to receive suitable brush material arranged vertically, the said brush material terminating on a plane with the bottom edges of the said sides, an auxiliary hopper having flaring sides, the said flaring sides straddling the sides of the bottom and sides portion of the planter, a fastening arranged at each end of the planter passing through the said flaring sides of the auxiliary hopper, the said sides of the bottom and sides portion, and through the partition of the partition and ends portion to tie the structure together, the said auxiliary hopper being provided with a central transverse partition and central longitudinal hinged doors, means for positioning said longitudinal hinged doors in a vertical position, and a longitudinal reciprocating slide arranged on the bottom of the said bottom and sides portion, said slide and said bottom of said bottom and sides portion being provided with means for dropping the seed from the planter, substantially as described and for the purposes set forth.

2. A planter of the character described comprising a bottom and sides portion cast integrally, said bottom being provided with openings to allow the seed to pass from the hopper, the sides of said bottom and sides portion being provided with grooves near the ends thereof, a partition and ends portion cast integrally, said partition and ends comprising a longitudinal partition and a central transverse partition, suitable brush material arranged in said transverse partition, means for maintaining the ends of the said partition and ends section and the said brush material a short distance above the upper surface of the said bottom and sides portion, an auxiliary hopper having sides, ends and a central transverse partition, the said sides of the said auxiliary hopper straddling the said sides of the bottom and sides portion, a fastening at each end of the structure passing through the said sides of the auxiliary hopper, the said sides of the bottom and sides portion, and the longitudinal partition of the partition and ends portion to tie the structure together, longitudinally disposed pivoted doors arranged in the auxiliary hopper, means for positioning the said doors in a vertical position longitudinally of the said hopper, and a seed slide provided with openings, said seed slide being adapted to be reciprocated in such manner as to carry the seed opening therein in line with the said openings in the said bottom and sides portion to drop the seed from the planter, substantially as described and for the purposes set forth.

3. A planter of the character described comprising a bottom and sides portion, a partition and ends portion positioned thereon, suitable brush material carried centrally and transversely of said partition and ends portion, an auxiliary hopper having sides, ends and a central transverse partition, said auxiliary hopper being arranged on the said bottom and sides portion and the said partition and ends portion, centrally and longitudinally disposed pivoted doors for said auxiliary hopper, a longitudinal rod upon which said pivoted doors are mounted, the said ends and transverse partition of the said auxiliary hopper being provided with grooves to receive the said longitudinal rod pivoting the said longitudinal doors and the said longitudinal doors resting upon the transverse partition of the partition and ends members when the structure is in an assembled position, fastening means passing transversely through the parts for tying and fastening the structure together, and a seed slide adapted to reciprocate between the bottom of the said bottom and sides portion and the ends and partitions of the partition and ends portion, said seed slide and said bottom of the bottom and sides portion being provided with means for dropping seed from the planter, substantially as described and for the purposes set forth.

In testimony whereof, I affix my signature, in presence of two witnesses.

CHARLES B. THOMAS.

Witnesses:
WM. J. NEALE,
C. HUGH DUFFY.

---

Copies of this patent may be obtained for five cents each, by addressing the "Commissioner of Patents, Washington, D. C."